Nov. 15, 1927. 1,649,042
J. G. RITTER
CONTOUR RECORDER
Filed Oct. 10, 1925

WITNESSES:
A. J. Schiefelbein
F. H. Miller

INVENTOR
John G. Ritter
BY
Wesley G. Carr
ATTORNEY

Patented Nov. 15, 1927.

1,649,042

UNITED STATES PATENT OFFICE.

JOHN G. RITTER, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTOUR RECORDER.

Application filed October 10, 1925. Serial No. 61,861.

My invention relates to contour recorders, and particularly to means for, and methods of, recording the contours of gear teeth.

One object of my invention is to provide a contour recorder that shall be simple and durable in construction, economical to manufacture and effective in its operation.

Another object of my invention is to provide a contour recorder in which the recording and record-receiving elements may be mounted on a single supporting means.

Another object of my invention is to provide a contour recorder in which the recording and record-receiving elements shall be capable of so clamping between them the device to be recorded as to hold the parts in relative position and to exclude light from portions of the chart where it is not desired.

A further object of my invention is to provide a method by which the contours of certain objects may be more effectively recorded than heretofore.

In devices, such as gear teeth, where substantially every increment of the operating surfaces thereof bears an important relation to the adjacent increments and to the surfaces of co-operating teeth, it has been difficult, in the past, to make a study thereof.

This difficulty is occasioned by the peculiar relation of the teeth and by reason of the thickness of the gears on which the teeth are disposed, the ordinary methods of tracing by pencil and making impressions on paper by chalking the teeth and placing them against the paper being cumbersome, inconvenient and more or less ineffective.

Further, the ordinary photographic methods of taking pictures are subject to errors in size, lights, shades and perspective and require the use of cameras and other expensive apparatus.

It is my aim to overcome all of the above-mentioned objections and to provide a method of, and means for, conveniently, economically and effectively recording the contours of gear teeth and devices of like nature.

Accordingly, in practicing my invention, I provide a method of recording the contours of gear teeth in which the record-receiving element is so shielded from a recording medium, such as light, by placing the record-receiving element against the gear or teeth to be recorded, as to more effectively obtain the records desired.

I also provide a simple, economical and effective device by which the recording and record-receiving elements may be so mounted on a single supporting means and so caused to effect the above-mentioned shielding operation, by clamping the object to be recorded between them, as to more effectively practice the method.

Figure 1 of the accompanying drawings is a plan view, partially in elevation and partially in section, of a device constructed in accordance with, and for practicing the method of, my invention, showing, in broken lines and in operative relation to the device, a pair of shaft-mounted gears.

Figure 1:
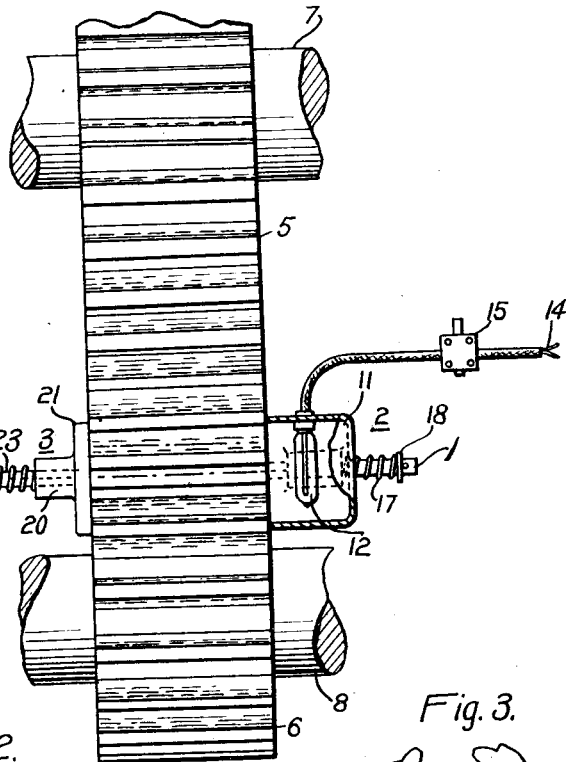
Figure 2:
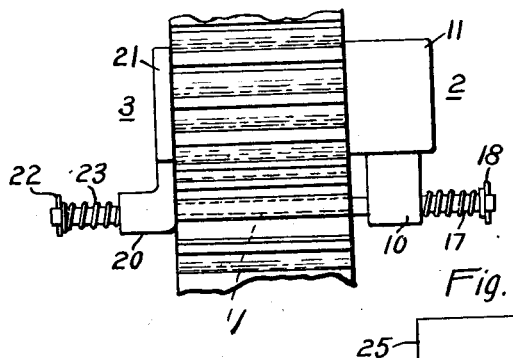
Fig. 2 is a side view, of the device of Fig. 1.
Figure 3:
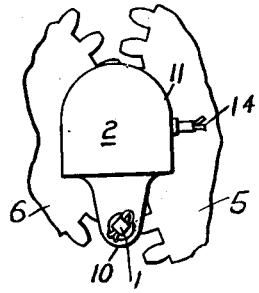
Fig. 3 is an end view, taken from the right of Figs. 1 and 2, as viewed in the drawings, showing the device and portions of the gears in full lines.

The method of my invention comprises the placing of a record-receiving element against the flat sides of gear teeth so as to shield all parts of the elements in contact with the teeth and in passing, or in permitting to pass, a medium between the teeth to discolor the area of the sheet between the teeth.

While my method contemplates the passing of heat, fluid or other media between the teeth and against a sheet or surface which is affected by these media, it preferably is practiced with a light-sensitized surface, such as on ordinary photographic or blueprint paper, and a source of light, such as an electric lamp.

A preferred form of device, for practicing the method, comprises in general, a main supporting means or rod 1, and a lamp device 2 and a chart-holder device 3 mounted on the rod 1 for operative positioning at opposite sides of one or both of gears 5 and 6 that are mounted on shafts 7 and 8, respectively.

The lamp device 2 comprises a bearing-support portion 10 that is longitudinally slidably mounted on the rod 1 and a housing or reflector portion 11 in which is supported a lamp 12 that is supplied with current through conductors 14 including a switch 15 for controlling the operation of the lamp. A spring 17 surrounds the rod 1 between the bearing portion 10 and a fixed projection 18 on the rod for biasing the lamp structure 2 along the rod 1 away from the projection 18.

The chart-holder device 3 comprises a bearing-support portion 20 that is also longitudinally slidably mounted on the rod 1, although either one of the bearing portions 10 and 20 may be fixed to the rod and the other movably mounted thereon, and a light-sensitized chart holder portion 21. Similarly to the lamp device 2, the chart-holder device 3 is also biased along the rod 1 away from a fixed projection 22 on the rod by a spring 23 which surrounds the rod between the bearing portion 20 and the projection 22.

The devices 2 and 3 are provided with adjacent surfaces conforming to portions of the elements or gears to be recorded and against which portions the surfaces are to be placed, in this instance the surfaces being flat to conform to the flat sides of the gears 5 and 6.

Figure 4:
Fig. 4 is a view illustrating the kind of record produced.

In operation, a light sensitized sheet, such as a sheet 25 shown in Fig. 4, is placed in the holder 21, in any suitable manner, so as to have its surface area slightly advanced toward the gears 5 and 6 from the remainder of the holder.

With the switch in the "off" position and the devices 2 and 3 forced apart along the rod 1 against the action of the springs 17 and 20 so as to clamp the gears 5 and 6 between them, the device is in position to effect a record. This position is such as to completely protect certain portions of the sheet 25 from the light of the lamp which is reflected between the gear teeth and to expose certain other portions of the sheet to this light.

Thus, when the switch 25 is operated to its "on" position and the sheet 25 exposed, a record, similar to that shown in Fig. 4, is obtained.

While I have shown and described a particular form of both the method and the device of my invention, various modifications may be effected therein without departing from the spirit and scope thereof, as set forth in the appended claims.

I claim as my invention:

1. A contour recorder comprising supporting means, a light-sensitive chart-supporting member, a source of light, and a member for supporting said source, said members being supported on said supporting means to receive between them an element, the contour of which is to be recorded, and being movable relatively toward each other to clamp said element between them.

2. A contour recorder comprising supporting means, a light-sensitive chart-supporting member, a source of light, a member for supporting said source, said members being supported on said supporting means to receive between them an element, the contour of which is to be recorded, and being movable relatively toward each other to clamp said element between them, and means for holding said members in clamped relative position.

3. A contour recorder comprising supporting means, a light-sensitive chart-supporting member, a source of light, and a member for supporting said source, said members being supported on said supporting means to receive between them an element, the contour of which is to be recorded, and one of said members being yieldingly biased toward the other to clamp said element between them.

4. A contour recorder comprising supporting means, a light-sensitive chart-supporting member, a source of light, a member for supporting said source, said members being supported on said supporting means to receive between them an element, the contour of which is to be recorded, and one of said members being slidably mounted on said means, and a spring operating between said slidably-mounted member and said means for biasing the slidably-mounted member toward the other member to clamp said element between the members.

In testimony whereof, I have hereunto subscribed my name this 28th day of September, 1925.

JOHN G. RITTER.